United States Patent
Hathorn

(10) Patent No.: US 10,391,959 B1
(45) Date of Patent: Aug. 27, 2019

(54) SELECTIVELY DEPLOYABLE SCHOOL BUS BUMPER

(71) Applicant: Brad Hathorn, Hindsville, AR (US)

(72) Inventor: Brad Hathorn, Hindsville, AR (US)

( * ) Notice: Subject to any disclaimer, the term of this patent is extended or adjusted under 35 U.S.C. 154(b) by 0 days.

(21) Appl. No.: 15/798,912

(22) Filed: Oct. 31, 2017

(51) Int. Cl.
*B60R 19/38* (2006.01)
*B60R 19/02* (2006.01)
*B60R 19/48* (2006.01)

(52) U.S. Cl.
CPC ............ *B60R 19/38* (2013.01); *B60R 19/023* (2013.01); *B60R 19/48* (2013.01)

(58) Field of Classification Search
CPC ........ B60R 19/38; B60R 19/023; B60R 19/48
USPC .......................................................... 293/118
See application file for complete search history.

(56) References Cited

U.S. PATENT DOCUMENTS

| | | | |
|---|---|---|---|
| 3,153,398 A * | 10/1964 | La Verne Runkle | B60J 9/02 116/28 R |
| 3,871,695 A | 3/1975 | Koenig | 293/73 |
| 4,018,299 A | 4/1977 | Nagin, Jr. et al. | 180/91 |
| 4,231,434 A | 11/1980 | Justus | 173/119 |
| 4,582,351 A * | 4/1986 | Edwards | B60R 19/56 293/102 |
| 4,688,824 A * | 8/1987 | Herring | B60R 21/34 280/762 |
| 5,022,703 A | 6/1991 | Westbrook | 296/183 |
| 5,101,927 A * | 4/1992 | Murtuza | B60T 7/22 180/275 |
| 6,053,691 A | 4/2000 | Weseman | 414/480 |
| 6,089,629 A | 7/2000 | Hope et al. | 293/132 |
| 6,109,675 A | 8/2000 | Sumrall | 293/118 |
| 6,116,667 A | 9/2000 | Torcomian | 293/132 |
| 6,176,529 B1 | 1/2001 | Kitzmiller et al. | 293/102 |
| 6,244,398 B1 | 6/2001 | Girvin et al. | 188/316 |
| 6,581,948 B2 | 6/2003 | Fox | 280/276 |
| 6,652,010 B1 | 11/2003 | Huddle et al. | 293/102 |
| 6,974,166 B2 * | 12/2005 | Ledford | B60R 19/56 293/102 |
| 7,052,404 B2 | 5/2006 | Heddon | 473/113 |
| 9,555,755 B2 | 1/2017 | Franiak et al. | 293/131 |
| 9,566,923 B2 | 2/2017 | Wylezinski et al. | 19/24 |
| D790,407 S | 6/2017 | Miller et al. | 12/106 |
| 2007/0290515 A1 | 12/2007 | Doan | 293/119 |
| 2015/0224949 A1* | 8/2015 | Cuddihy | B60R 19/023 293/118 |

* cited by examiner

*Primary Examiner* — Joseph D. Pape
(74) *Attorney, Agent, or Firm* — Keisling & Pieper PLC; David B. Pieper

(57) ABSTRACT

A selectively deployable lower rear bumper for the back end of a school bus. The deployable bumper is mounted using a support frame including mounting holes for connection to the bus frame and a deployment frame is moveably connected to the support frame. A bumper bar is connected to the deployment frame and a deployment motivator is connected to the support frame and the deployment frame to move the bumper bar between a retracted position and an extended position. Various circuit interfaces are electrically connected to the bus circuit and the deployment motivator for automatic operation of the deployment motivator.

10 Claims, 3 Drawing Sheets

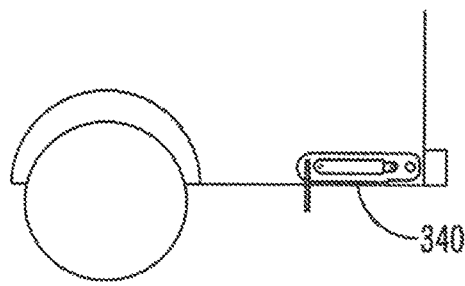
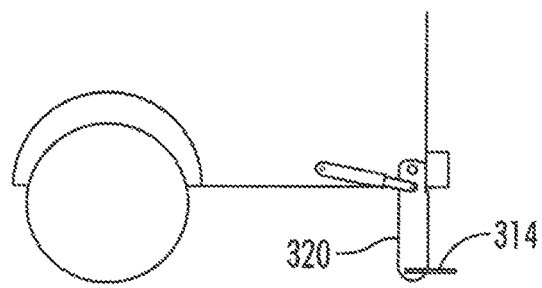
FIG. 4  FIG. 5
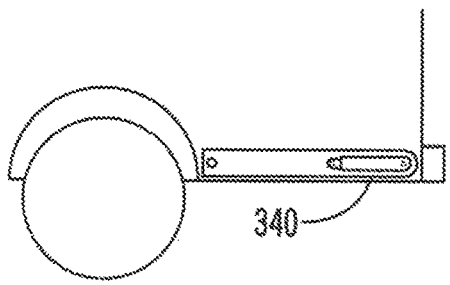
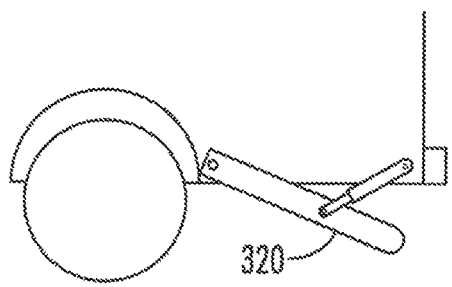
FIG. 6  FIG. 7
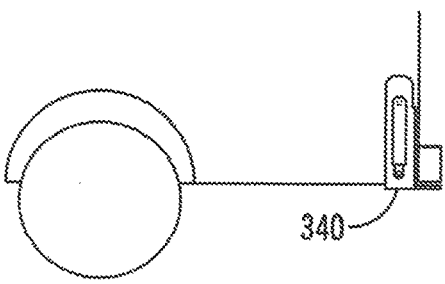
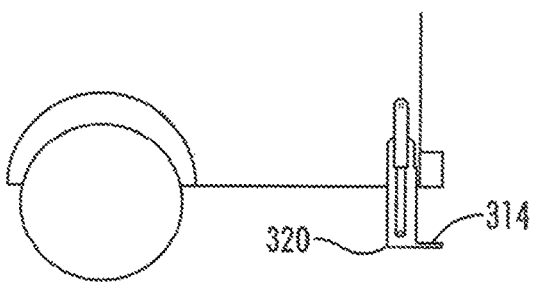
FIG. 8  FIG. 9

SELECTIVELY DEPLOYABLE SCHOOL BUS BUMPER

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in bumpers. More particularly, the invention relates to improvements particularly suited for a school bus. In particular, the present invention relates specifically to a deployable bumper operated by the stop sign, crossing bar, or brake light circuits of a school bus.

2. Description of the Known Art

As will be appreciated by those skilled in the art, bumpers are known in various forms. Patents disclosing information relevant to bumpers or shock absorbers include: U.S. Pat. No. D790,407, issued to Miller, et al. on Jun. 27, 2017 entitled Trailer rear impact guard; U.S. Pat. No. 9,566,923, issued to Wylezinski, et al. on Feb. 14, 2017 entitled Rear impact guard; U.S. Pat. No. 9,555,755 issued to Franiak, et al. on Jan. 31, 2017 entitled Rear guard assembly; U.S. Pat. No. 7,052,404, issued to Heddon on May 30, 2006 entitled Rail positioning device for retractable bumper assembly; U.S. Pat. No. 6,652,010 issued to Huddle, et al. on Nov. 25, 2003 entitled Rear impact guard assembly for trailers; U.S. Pat. No. 6,176,529 issued to Kitzmiller, et al. on Jan. 23, 2001 entitled Torsional under-ride guard; U.S. Pat. No. 6,116,667, issued to Torcomian on Sep. 12, 2000 entitled Trailer underride crash guard; U.S. Pat. No. 6,109,675 issued to Sumrall on Aug. 29, 2000 entitled Hinged member for a rear impact guard; U.S. Pat. No. 6,089,629 issued to Hope, et al. on Jul. 18, 2000 entitled Underrun guard for road vehicles; U.S. Pat. No. 6,244,398, issued to Girvin, et al. on Jun. 12, 2001 entitled Shock absorber with variable bypass damping; U.S. Pat. No. 4,231,434, issued to Justus on Nov. 4, 1980 entitled Hydraulic impact device; U.S. Pat. No. 4,018,299, issued to Nagin, Jr., et al. on Apr. 19, 1977 entitled Decelerating safety bumper for vehicles and the like; and U.S. Pat. No. 6,581,948 issued to Fox on Jun. 24, 2003 entitled Inertia valve shock absorber. Each of these patents is hereby expressly incorporated by reference in their entirety. From these prior references it may be seen that these prior art patents are very limited in their teaching and utilization, and an improved selectively deployable bus bumper is needed to overcome these limitations.

SUMMARY OF THE INVENTION

The present invention is directed to an improved selectively deployable lower rear bumper using a support frame for mounting a moveable deployment frame with a bumper bar. In accordance with one exemplary embodiment of the present invention, a selectively deployable lower rear bumper is provided using a deployment motivator using a deployment circuit with interfaces into various bus circuits for controlling the bumper bar deployment. One-way interfaces into the stop sign circuit, stop light circuit, brake circuit, cross arm circuit, and an independent switch circuit are provided. An apparatus and method for using a hydraulic cylinder for energy absorption is also provided. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 4 is a perspective view of a back hinged selectively deployable bumper in the carry position.

FIG. 5 is a perspective view of a back hinged selectively deployable bumper in the deployed position.

FIG. 6 is a perspective view of a front hinged selectively deployable bumper in the carry position.

FIG. 7 is a perspective view of a front hinged selectively deployable bumper in the deployed position.

FIG. 8 is a perspective view of a vertically selectively deployable bumper in the carry position.

FIG. 9 is a perspective view of a perspective view of a vertically selectively deployable bumper in the deployed position.

DETAILED DESCRIPTION OF THE INVENTION

Figure 1:
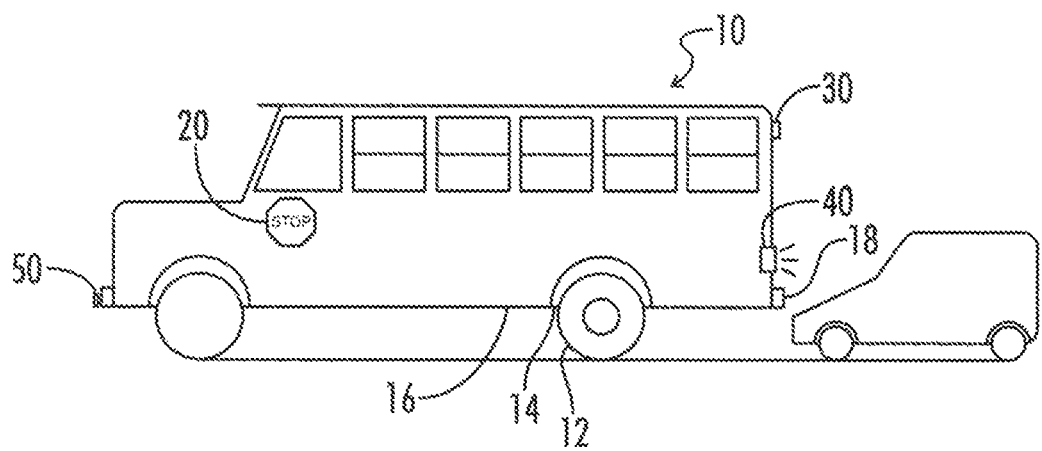
FIG. 1 is a perspective view of a school bus and passenger vehicle before impact.

As shown and understood in FIGS. 1-12b of the drawings, one exemplary embodiment of the present invention is generally shown as a selectively deployable lower rear bumper 100 for use on a school bus 10. FIG. 1 shows a schematic view of the school bus 10 with a rear wheel 12 connected to a bus frame 14 for supporting a bus body 16 with a body height rear bumper 18. The bus 10 includes a stop sign 20 operated by a sign circuit 522, a set of stop lights 30 controlled by a light circuit 532, brake lights 40 operated by a brake circuit 542, and a crossing arm 50 controlled by an arm circuit 552.

Figure 2:
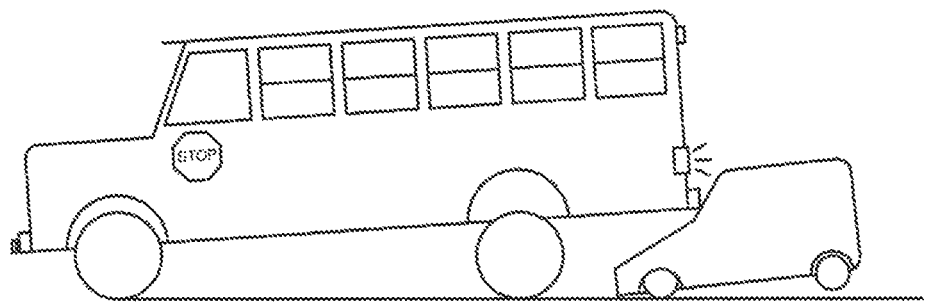
FIG. 2 is a perspective view of a school bus and passenger vehicle nosedive effect at impact.
Figure 3:
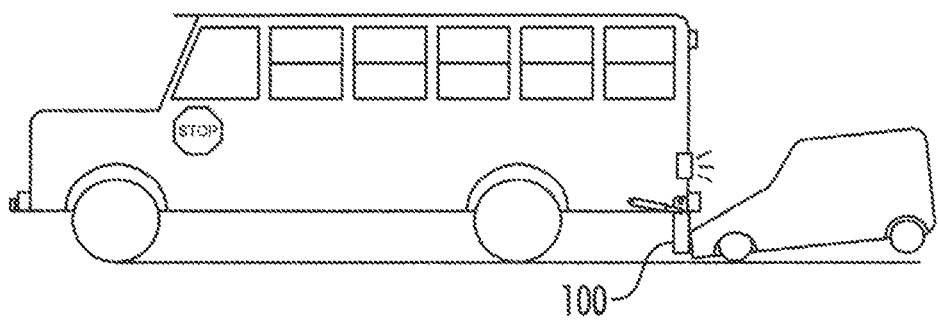
FIG. 3 is a perspective view of a school bus and passenger vehicle nosedive blocked by the selectively deployable bumper of the present invention.
Figure 10:
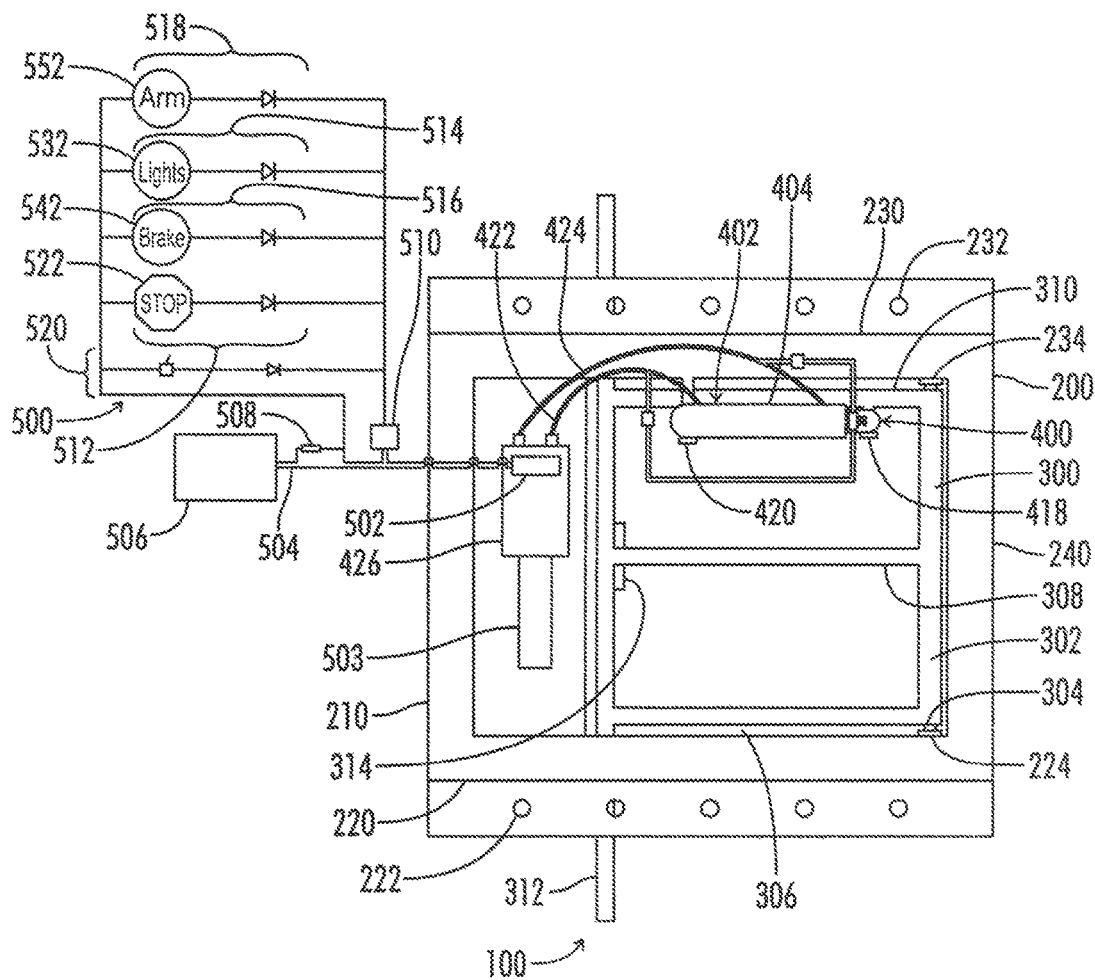
FIG. 10 is a perspective view of a deployment motivator and deployment circuit connection for operation a selectively deployable bumper using an extending cylinder.
Figure 11:
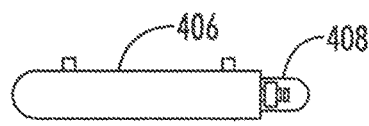
FIG. 11 is a top view of an extending cylinder with a tooth rail and actuator stop.
Figure 12A:
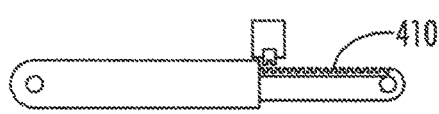
FIG. 12*a* is a side view of a partially extended extending cylinder with a tooth rail and actuator stop in the disengaged position.
Figure 12B:
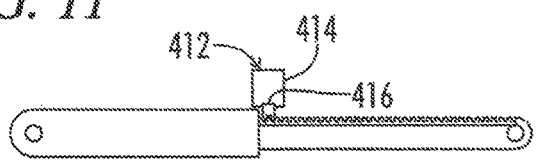
FIG. 12*b* is a side view of a fully extended extending cylinder with a tooth rail and actuator stop in the engaged position.

FIG. 2 shows the problem with the rear wheel 12 being in front of the body height rear bumper 18 and the resultant rear overhang 17 that extends from the rear wheel 12 to the body height rear bumper 18. While this rear overhang 17 increases bus carrying capacity, it causes two problems. First, the bus 10 must still be able to drive across railroad tracks, through dips, and other obstacles that require ground clearance such that the body height rear bumper 18 is positioned as high as possible off of the ground. Second, as shown by comparing FIGS. 1 and 2, this overhang 17 creates the ability for a vehicle 75 to nose dive underneath the body height rear bumper 18.

The present invention solves this prior art problem using a selectively deployable lower rear bumper 100. The selectively deployable lower rear bumper 100 uses a support frame 200 to mount a deployment frame 300. Movement of the deployment frame 300 controls the position of the bumper bar 312 and step 314 as it moves to the deployed position 320 from the retracted position 340. A deployment motivator 400 controls the movement of the deployment frame 300 in relation to the support frame 200. The operation of the deployment motivator 400 is controlled by the deployment circuit 500.

The support frame 200 includes a front cross bar 210 and rear cross bar 240 connecting a left frame bar 220 and a right frame bar 230. The left frame bar 220 defines left frame mounting holes 222 and left frame axle apertures 224. The right frame bar 230 defines right frame mounting holes 232 and right frame axle aperture 234. The support frame 200 can be made of any material, but the current recommended construction is of steel or a lightweight welded metal.

The deployment frame 300 uses a hinge bar 302 pivotally mounted on a hinge axle 304, the hinge axle 304 is mounted through the left frame axle apertures 224, hinge bar 302 continuously to the right frame axle aperture 234 to be able to transfer any vehicle 75 impact load to the bus frame 14. Thus, the hinge axle 304 should be designed to the largest impact load expected from a vehicle 75. The hinge bar mounts the left deployment arm 306, mid deployment arm 308, and right deployment arm 310 which are connected to the bumper bar 312. The bumper bar can include a bar step 314 to allow for a lower step for children to exit the rear of the bus 10.

The deployment motivator 400 is constructed as an extending actuator 402 and the preferred embodiment uses a hydraulic cylinder 404. The hydraulic cylinder 404 includes a main body 406 for operating an extending arm 408. The extending arm 408 can include a tooth rail 410 that is engaged by an actuator stop 412 to hold the extending arm in position in either the retracted position 340 or in a partially deployed or fully deployed deployment position 320. The actuator stop 412 uses a tooth actuator 414 for movement of a tooth bolt 416 into and out of engagement with the tooth rail 410.

The hydraulic cylinder 404 is connected via a rotating deployment connection 418 to the deployment frame 300 and a rotating support connection 420 to the support frame 200. Extension and contraction of the hydraulic cylinder 404 is used via hydraulic pressure provided through the extension fluid line 422 and retraction fluid line 424 connections to the fluid pump 426.

The tooth actuator 414 simply moves the actuator stop 412 into engagement with the tooth rail 410. One embodiment uses a cam wheel and track type of mechanical type system that lifts the actuator stop 412 at everything except the fully deployed condition or can be another hydraulic actuator as shown in the FIGS. 11-12b. When the tooth actuator 414 is a hydraulic actuator, the tooth actuator 414 can be operated off of a burst disc or valve sensing the overload hydraulic pressure caused by the vehicle 75 hitting the bumper bar 312 and causing an overload movement of the extending arm 408. Thus, looking at FIG. 3, one can see that the impact of the vehicle will attempt to compress the hydraulic cylinder 404 which results on increased pressure on the extension fluid line 422 and suction on the retraction fluid line 424 and in FIG. 7 one can see that the impact would attempt to extend the hydraulic cylinder 404 for increased pressure on the retraction fluid line 424 and suction on the extension fluid line 422. In both of these designs, the hydraulic cylinder 404 can be used as an initial soft impact absorber similar to a bumper dampener or suspension shock absorber. Additionally, an inertia shock absorber valve or burst disc can be used that redirects the increased hydraulic pressure and suction to the appropriate sides of the tooth actuator to engage the actuator stop 412 into the tooth rail 410 to stop all further movement of the extending arm 408.

The deployment circuit 500 controls operation of the fluid pump 426 via a pump control 502 and pump motor 503 which can be as simple as deployment to a deployed position and retraction operation to a retracted position depending on the signal from the wiring harness 504. The wiring harness 504 is connected to the power supply 506 and includes a basic fuse 508 protection and isolation through a control solenoid 510. The wiring harness 504 can include a stop circuit interface 512 to move the deployable lower rear bumper 100 to the lower position when the stop sign is deployed and retract the deployable lower rear bumper 100 when the stop sign is retracted.

The wiring harness 504 can include a flashing light circuit interface 514 to move the deployable lower rear bumper 100 to the lower position when the flashing lights on the school bus are activated and retract the deployable lower rear bumper 100 when the flashing lights are turned off.

The wiring harness 504 can include a brake circuit interface 516 to move the deployable lower rear bumper 100 to the lower position when the brakes on the school bus are activated and retract the deployable lower rear bumper 100 when the brakes are released. A delay or speed sensor can also be built in so that the deployable lower rear bumper 100 only activates when the bus is coming to a stop and not when the bus is operating at speed.

The wiring harness 504 can include an arm circuit interface 518 to move the deployable lower rear bumper 100 to the lower position when the crossing arm on the front of the school bus is activated and retract the deployable lower rear bumper 100 when the crossing arm is retracted.

The wiring harness 504 can include a simple manual switch circuit interface 520 to move the deployable lower rear bumper 100 to the lower position when the switch is manually activated and retract the deployable lower rear bumper 100 when the manual switch is deactivated.

Reference numerals used throughout the detailed description and the drawings correspond to the following elements:

School bus 10
Rear wheel 12
Bus frame 14
Bus body 16
Rear bumper 18
Stop sign 20
Stop lights 30
Brake lights 40
Crossing arm 50
Selectively deployable lower rear bumper 100
Support frame 200
   Front cross bar 210
   Left frame bar 220
      Left frame mounting holes 222
      Left frame axle apertures 224
   Right frame bar 230
      Right frame mounting holes 232
      Right frame axle aperture 234
   Rear cross bar 240
Deployment frame 300
   Hinge bar 302
   Hinge axle 304
   Left deployment arm 306
   Mid deployment arm 308
   Right deployment arm 310
   Bumper bar 312
   Bar step 314
   Deployed position 320
   Retracted position 340
Deployment motivator 400
   Extending actuator 402
      Hydraulic cylinder 404
         Main body 406
         Extending arm 408
         Tooth rail 410
         Actuator stop 412
            Tooth actuator 414
            Tooth bolt 416
   Deployment connection 418
   Support connection 420
   Extension fluid line 422
   Retraction fluid line 424
   Fluid pump 426
Deployment circuit 500
   Pump control 502
   Pump motor 503
   Wiring harness 504
   Power supply 506
   Fuse 508
   Control solenoid 510
   Stop circuit interface 512
   Light circuit interface 514
   brake circuit interface 516
   arm circuit interface 518
   switch circuit interface 520
   Sign circuit 522
   Light circuit 532
   Brake circuit 542
   Arm circuit 552

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A selectively deployable lower rear bumper apparatus for a school bus including a bus frame, and an electrical system including at least one bus circuit, the apparatus comprising:
   a support frame including mounting holes for connection to the bus frame the support frame including a left frame bar defining a left frame axle aperture and a right frame bar defining a right frame axle aperture;
   a deployment frame including a hinge bar moveably connected to the support frame by a single hinge axle mounted through the left frame axle aperture, hinge bar, and right frame axle aperture;
   a bumper bar connected to the deployment frame;
   a deployment motivator connected to the support frame and the deployment frame to move the bumper bar between a retracted position and an extended position; and
   a circuit interface electrically connected to the bus circuit and the deployment motivator.

2. The apparatus of claim 1, further comprising:
a bar step connected to the bumper bar.

3. The apparatus of claim 1, further comprising:
the deployment motivator including an extending actuator.

4. The apparatus of claim 1, further comprising:
the extending actuator including a hydraulic cylinder.

5. The apparatus of claim 1, further comprising:
the extending actuator including a tooth rail; and
an actuator stop selectively moveable to engage the tooth rail.

6. The apparatus of claim 1, the bus circuit including a sign circuit, the apparatus further comprising:
   the circuit interface including a stop circuit interface electrically connected to the sign circuit.

7. The apparatus of claim 1, the bus circuit including a stop light circuit, the apparatus further comprising:

the circuit interface including a light circuit interface electrically connected to the stop light circuit.

8. The apparatus of claim 1 the bus circuit including a brake circuit, the apparatus further comprising:
the circuit interface including a brake circuit interface electrically connected to the brake circuit.

9. The apparatus of claim 1 the bus circuit including a crossing arm circuit, the apparatus further comprising:
the circuit interface including a crossing arm circuit interface electrically connected to the crossing arm circuit.

10. The apparatus of claim 1 the bus circuit including a switch circuit, the apparatus further comprising:
the circuit interface including a switch circuit interface electrically connected to the switch circuit.

* * * * *